United States Patent [19]

Gingerich et al.

[11] Patent Number: 5,417,945

[45] Date of Patent: May 23, 1995

[54] PROCESS FOR RECOVERING TUNGSTEN AS AN AMMONIACAL TUNGSTATE COMPOUND IN WHICH AMMONIACAL TUNGSTATE LIQUORS ARE RECLAIMED

[75] Inventors: Richard G. W. Gingerich; James N. Christini, both of Towanda; Martin C. Vogt, Monroeton; Clarence D. Vanderpool; Michael J. Miller, both of Towanda, all of Pa.

[73] Assignee: GTE Products Corporation, Danvers, Mass.

[21] Appl. No.: 795,310

[22] Filed: Nov. 14, 1991

Related U.S. Application Data

[63] Continuation of Ser. No. 570,761, Aug. 22, 1990, abandoned.

[51] Int. Cl.$^6$ .............................................. C01G 41/00
[52] U.S. Cl. ........................................ 423/56; 423/55
[58] Field of Search ........................ 423/53, 54, 55, 56

[56] References Cited

U.S. PATENT DOCUMENTS

| | | | |
|---|---|---|---|
| 4,328,190 | 5/1982 | Beckstead | 423/54 |
| 4,346,061 | 8/1982 | Goddard | 423/56 |
| 4,353,880 | 10/1982 | Quatrini | 423/58 |
| 4,360,503 | 11/1982 | Boyer et al. | 423/54 |
| 4,450,144 | 5/1984 | Lafferty | 423/53 |
| 4,882,131 | 11/1989 | Powers | 423/54 |

Primary Examiner—R. Bruce Breneman
Attorney, Agent, or Firm—Elizabeth A. Levy; Robert F. Clark

[57] ABSTRACT

A process for recovering tungsten as an ammoniacal tungstate which comprises reacting a tungsten containing material with sodium hydroxide to produce sodium tungstate and forming a first aqueous sodium tungstate solution therefrom, crystallizing sodium tungstate from the first aqueous sodium tungstate solution, dissolving the resulting sodium tungstate crystals in an aqueous medium to form a second aqueous sodium tungstate solution, extracting tungsten from the second aqueous sodium tungstate solution with an organic extracting agent wherein the extracting agent containing tungsten is capable of being stripped of the extracted tungsten by ammonia, and thereafter stripping the extracted tungsten from the organic extracting agent with ammonia to form an ammoniacal tungstate solution, crystallizing a portion of the tungsten contained in the ammoniacal tungstate solution to form a two phase system wherein an ammoniacal tungstate compound comprises the first phase and wherein the resulting mother liquor containing the balance of the contained tungsten comprises the second phase, and repeating the process using the mother liquor as at least a portion of the aqueous medium to dissolve the sodium tungstate crystals.

2 Claims, 2 Drawing Sheets

PROCESS FOR RECOVERING TUNGSTEN AS AN AMMONIACAL TUNGSTATE COMPOUND IN WHICH AMMONIACAL TUNGSTATE LIQUORS ARE RECLAIMED

This is a continuation of application Ser. No. 07/570,761, filed on Aug. 22, 1990, now abandoned.

BACKGROUND OF THE INVENTION

This invention relates to a process for recovering tungsten as an ammoniacal tungstate compound by a process which involves forming sodium tungstate from a starting tungsten bearing material, crystallizing and redissolving the sodium tungstate, extracting tungsten by an organic extracting agent, and subsequently stripping the tungsten from the organic with ammonia to form an ammoniacal tungstate solution. This solution is crystallized to form an ammoniacal tungstate compound. The process makes use of a procedure in which the mother liquor resulting from the crystallization of the ammoniacal tungstate compound is used in redissolving the sodium tungstate. Reuse of the mother liquor in this manner affords environmental and economic advantages.

Tungsten is manufactured either from ores or scrap sources. If scrap material is the starting material it is converted to an oxide before the digestion step. Digestions are carried out at either atmospheric pressure or higher pressures depending on the type of material, with an excess of sodium hydroxide. During the digestion the tungsten is converted into an impure sodium tungstate. To remove excess sodium hydroxide, the digestion solution is evaporated to form sodium tungstate crystals. This is done preferably in continuous crystallizer which separates the sodium tungstate crystals from the sodium hydroxide. The sodium hydroxide is recycled back to the starting (digestion) process. At this point the impure sodium tungstate crystals are redissolved in water and treated to remove the impurities such as molybdenum, arsenic, silica, and phosphorus. The solution is further processed by liquid-liquid extraction in which the tungsten is extracted from the sodium tungstate solution by an organic extracting agent. The tungsten is then stripped from the organic with ammonia to form an ammoniacal tungstate solution. An ammoniacal tungstate compound is then crystallized from this solution. The resulting mother liquor contains tungsten and a fairly high concentration of impurities. Prior to the present invention this mother liquor was recycled to the sodium tungstate recrystallization step at which point it was added to the digestion solution prior to the crystallization of the sodium tungstate. Because the mother liquor contains a large amount of ammonia which is released during the crystallization by the sodium hydroxide, it causes major venting problems and lower yield of sodium tungstate crystals.

It would be an advantage both environmentally and economically to eliminate the problems caused by the release of ammonia and at the same time to recycle the mother liquor.

SUMMARY OF THE INVENTION

In accordance with one aspect of the invention, there is provided a process for recovering tungsten as an ammoniacal tungstate which comprises reacting a tungsten containing material with sodium hydroxide to produce sodium tungstate and forming a first aqueous sodium tungstate solution therefrom, crystallizing sodium tungstate from the first aqueous sodium tungstate solution, dissolving the resulting sodium tungstate crystals in an aqueous medium to form a second aqueous sodium tungstate solution, extracting tungsten from the second aqueous sodium tungstate solution with an organic extracting agent wherein the extracting agent containing tungsten is capable of being stripped of the extracted tungsten by ammonia, and thereafter stripping the extracted tungsten from the organic extracting agent with ammonia to form an ammoniacal tungstate solution, crystallizing a portion of the tungsten contained in the ammoniacal tungstate solution to form a two phase system wherein an ammoniacal tungstate compound comprises the first phase and wherein the resulting mother liquor containing the balance of the contained tungsten comprises the second phase, and repeating the process using the mother liquor as at least a portion of the aqueous medium to dissolve the sodium tungstate crystals.

DETAILED DESCRIPTION OF THE INVENTION

For a better understanding of the present invention, together with other and further objects, advantages and capabilities thereof, reference is made to the following disclosure and appended claims in connection with the above described figures and description of some of the aspects of the invention.

The present invention provides a process for producing an ammoniacal tungstate product by a method in which a tungsten bearing material is digested in sodium hydroxide to form a digestion sodium tungstate solution from which sodium tungstate is crystallized. The sodium tungstate is redissolved in an aqueous medium and the tungsten is extracted by an organic extracting agent and then stripped from the organic by ammonia to form an ammoniacal tungstate solution. An ammoniacal tungstate compound is then crystallized from the ammoniacal tungstate solution. The mother liquor from this crystallization is recycled to be used as at least a portion of the aqueous medium in which the sodium tungstate crystals are dissolved prior to the extraction step. Prior to the present invention water was used as the aqueous medium. Recycling of this mother liquor in this manner results in elimination of a waste stream without disadvantages of release of ammonia which was the case prior to the present invention when the liquor was recycled to the digestion solution prior to the crystallization of sodium tungstate from that solution. Another advantage is conservation of water since water is no longer needed as the aqueous medium. Furthermore, substitution of the mother liquor for water as the aqueous medium does not adversely affect the purity of the final product. No change in purification procedures is necessary.

Figure 1:
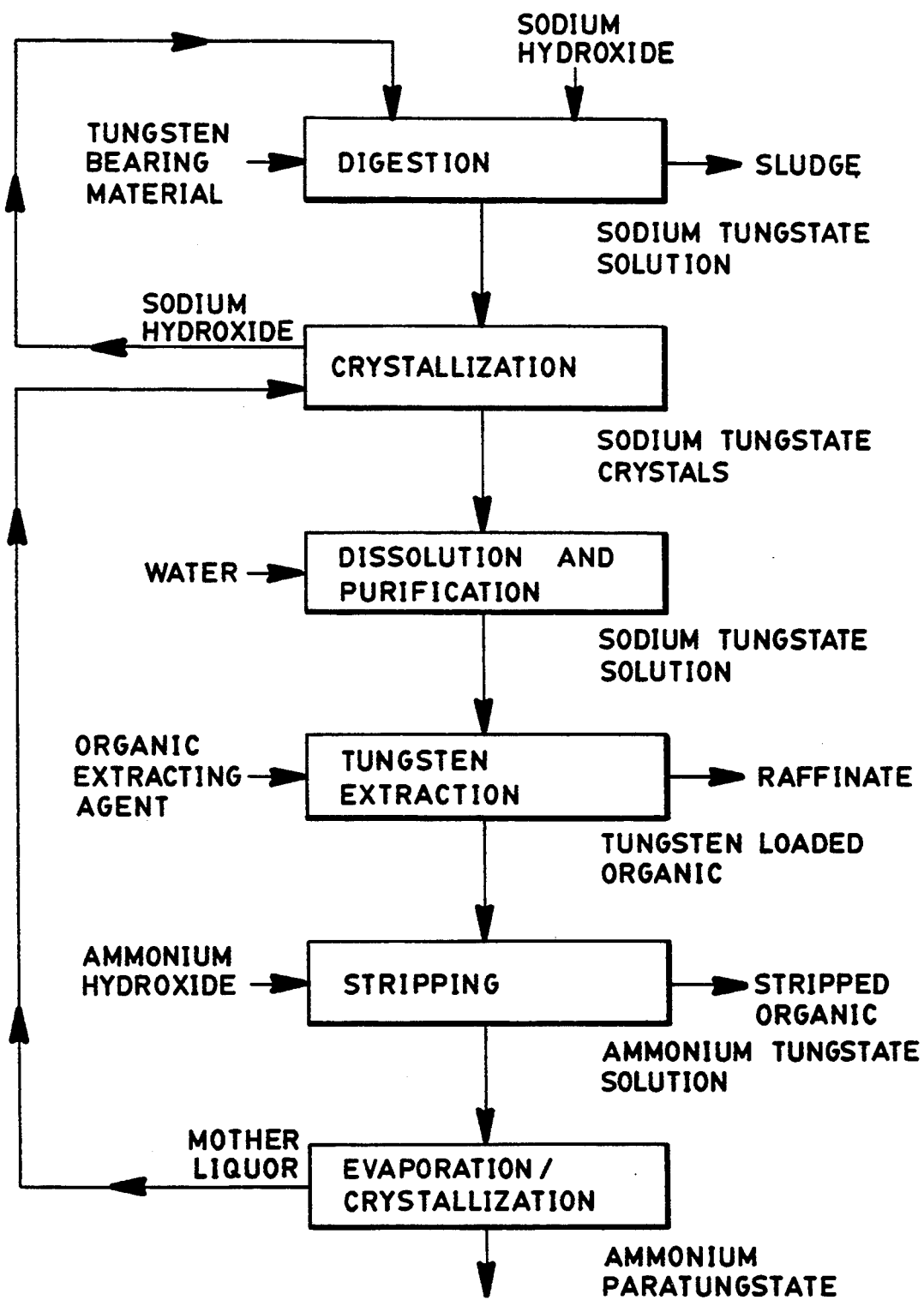
FIG. 1 is a schematic diagram showing the main steps of the general process prior to the present invention in which the mother liquor was recycled to the crystallization step prior to crystallizing the sodium tungstate.
Figure 2:
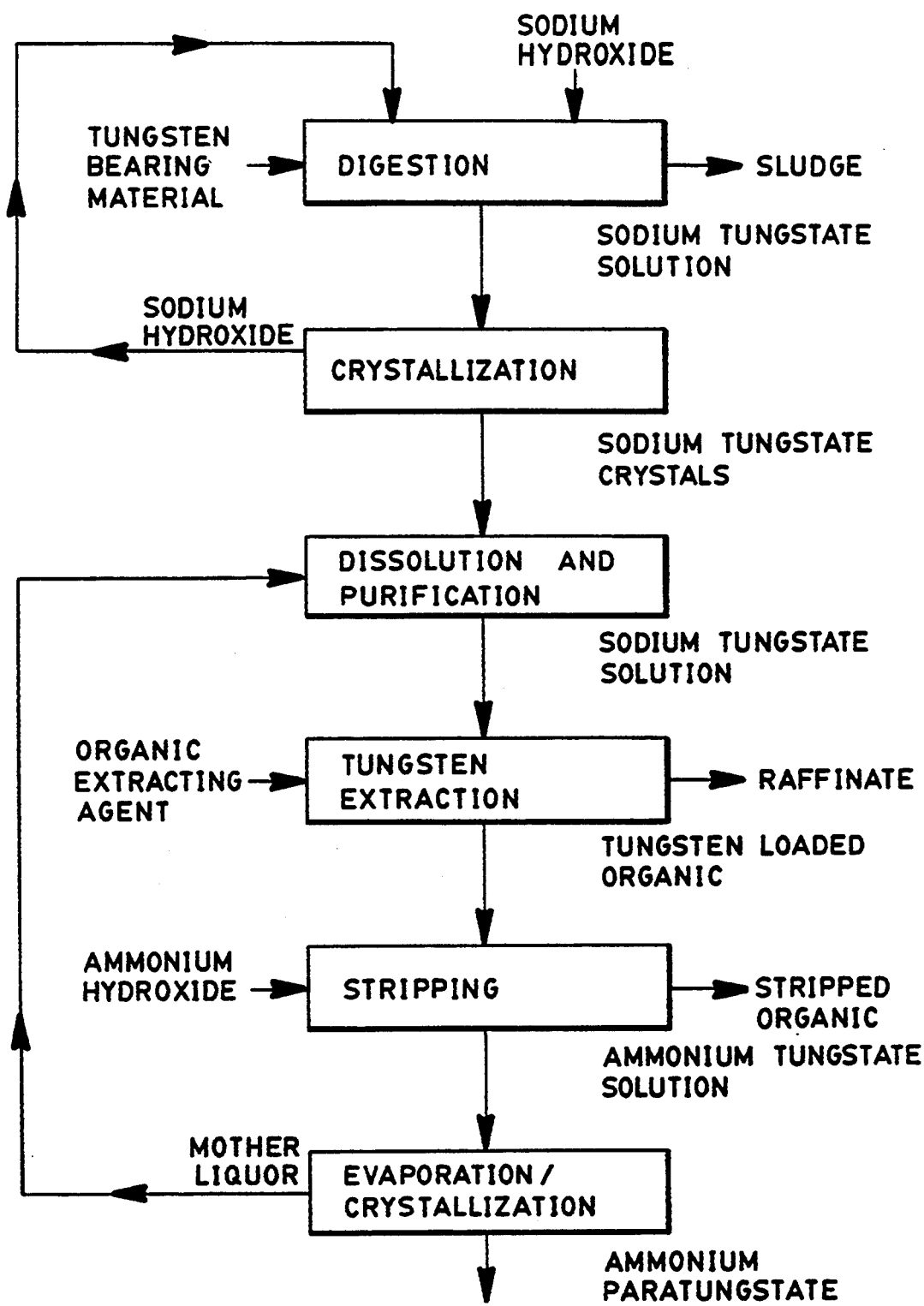
FIG. 2 is a schematic diagram showing the main steps of the general process according to the present invention in which the mother liquor is recycled to dissolve the sodium tungstate crystals.

FIG. 1 shows the main steps of the general process prior to the present invention in which the mother liquor was recycled to the crystallization step prior to crystallizing the sodium tungstate. FIG. 2 shows the main steps of the general process according to the present invention in which the mother liquor is recycled to dissolve the sodium tungstate crystals.

The tungsten bearing material from which the ammoniacal tungstate compound is to be derived can be any material that when reacted with sodium hydroxide will yield sodium tungstate. The most preferred materials are tungsten ores such as wolframite, ferberite, huebnerite, and scheelite. Tungsten scrap material can also be used, such as that which results from manufacture of tungsten carbide or cemented tungsten carbide parts.

The tungsten bearing material is reacted with sodium hydroxide to produce sodium tungstate. This is done by methods known in the art. One preferred method is to digest the material in concentrated sodium hydroxide solution, preferably about 14 normal to about 19 normal. If tungsten scrap is used, the material is first converted to the oxide by conventional methods such as air firing. The tungsten bearing material is digested at an elevated temperature either in atmospheric pressure or under elevated pressures, depending on the type of material, for a sufficient time to convert essentially all of the material to sodium tungstate. The resulting digestion mixture is diluted with water to dissolve the tungsten and form a first aqueous sodium tungstate solution or digestion solution. The insoluble residue or sludge is then removed preferably by filtration. The sludge can be processed if necessary to recover any valuable materials that remain therein, or discarded. Some preferred digestion methods are described and claimed in U.S. Pat. Nos. 4,353,878, 4,353,879, 4,353,880, and 4,353,881. Those patents are herein incorporated by reference. The resulting digestion solution is impure and is very high in sodium hydroxide. Some of the typical impurities include silica, arsenic, phosphorus, and molybdenum, and these can vary depending on the source of the starting material and the impurity content of the sodium hydroxide.

To partially purify the digestion solution and to remove excess sodium hydroxide, sodium tungstate is crystallized therefrom. Although any method can be used to accomplish the crystallization, it is done preferably by evaporating it in a continuous crystallizer commonly called an evaporator/crystallizer. The sodium hydroxide is recycled back to the digestion process.

The sodium tungstate crystals which are still relatively impure with respect to Si, As, P, and Mo are dissolved in an aqueous medium to form a second aqueous sodium tungstate solution. Prior to the present invention water was used as the aqueous medium throughout the process, that is, in every process cycle. According to the present invention, the aqueous medium is the mother liquor resulting from the subsequent crystallization of the ammoniacal tungstate compound which will be described later. However, on initial startup of the process, when there is no such mother liquor available, water can be used in the first cycle and thereafter the mother liquor, once formed in the initial cycle, is used. The mother liquor can make up the entire aqueous medium, or at least a portion of it, depending on factors such as quantity of mother liquor available and the amount of crystals that are to be dissolved. Water can make up the balance of the aqueous medium. The advantage is that the mother liquor can be recycled without problems and not end up as a waste stream that has to be disposed of. Prior to the present invention, this mother liquor was added to the crystallization step before crystallization of the sodium tungstate. However, because the mother liquor contained a large amount of ammonia which was released during the crystallization (in the crystallizer) by the sodium hydroxide, it caused major venting problems and less production of sodium tungstate crystals. The lower production results from poor heat transfer in the crystallizer. The second aqueous sodium tungstate solution is treated to remove impurities as molybdenum, arsenic, silica, and phosphorus, or other impurities by methods well known in the art. Even with use of the mother liquor from the crystallization of the ammoniacal tungstate compound as the aqueous medium, the impurities can be removed by the standard methods with no variation. In other words, use of this mother liquor to dissolve the sodium tungstate crystals does not introduce excessively high levels of impurities into the resulting solution which could possibly necessitate changes in the purification techniques. For example, when sodium tungstate crystals obtained from the crystallization step are added to the mother liquors, analysis show the Si to be typically <20 mg/l, the arsenic to be typically <10 mg/l, and the P to be typically <1 mg/l. These levels are essentially no different than levels present when water is used as the aqueous medium.

The resulting second aqueous sodium tungstate solution, after the purification procedure or procedures, is then contacted with an organic extracting agent to selectively extract the tungsten. The pH of the solution may have to be adjusted prior to the extraction. The extracting agent can be any extracting agent selective for tungsten. However the tungsten must be able to be stripped from the organic by ammonia in order to form an ammoniacal tungstate strip solution.

In accordance with a preferred embodiment the tungsten is extracted in a liquid-liquid extraction system. The preferred extracting agents are amines such as tertiary amines. In this type of system, the pH is adjusted to the acid side. The tungsten containing organic is then contacted with ammonia or ammonium hydroxide to strip the tungsten therefrom and form an ammoniacal tungstate solution. The solution is normally ammonium tungstate, commonly called the AT solution. The stripped organic is then washed and regenerated for reuse. The preferred extraction and stripping systems, although the invention is not limited to these, are described and claimed in U.S. Pat. Nos. 4,175,109, 4,374,099, 4,369,165, 4,360,502, 4,360,503, and 4,370,126. Those patents are herein incorporated by reference.

The resulting ammoniacal tungstate is then evaporated to crystallize an ammoniacal tungstate compound which is commonly ammonium paratunstate (APT). The ammonium paratungstate crystals are then separated from the resulting mother liquor by standard techniques such as filtration. The mother liquor contains some tungsten and impurities. This mother liquor is recycled to the sodium tungstate crystallization step where it is used as the aqueous medium to dissolve the sodium tungstate crystals as has been previously described. The advantages of recycling this mother liquor have been discussed.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a process for recovering tungsten from a tungsten-containing material comprising the steps of digesting said tungsten-containing material in a sodium hydroxide solution to form a first sodium tungstate solution, evaporating said first sodium tungstate solution to obtain sodium tungstate crystals, dissolving said sodium tungstate crystals in an aqueous medium to form a second sodium tungstate solution, treating said second sodium tungstate solution to remove dissolved impurities therefrom and form a third sodium tungstate solution, treating said third sodium tungstate solution with an organic extracting agent to remove tungsten therefrom and obtain an ammonium tungstate solution, evaporating said ammonium tungstate solution to form ammonium paratungstate crystals and a mother liquor, said mother liquor containing dissolved impurities including tungsten, silicon, arsenic, phosphorus and molybdenum, the improvement comprising: the use of said mother liquor for at least a portion of said aqueous medium in which said sodium tungstate crystals are dissolved in a subsequent tungsten recovery process.

2. In a process for recovering tungsten from a tungsten-containing material comprising the steps of digesting said tungsten-containing material in a sodium hydroxide solution to form a first sodium tungstate solution, evaporating said first sodium tungstate solution to obtain sodium tungstate crystals, dissolving said sodium tungstate crystals in an aqueous medium to form a second sodium tungstate solution, treating said second sodium tungstate solution to remove dissolved impurities therefrom and form a third sodium tungstate solution, treating said third sodium tungstate solution with an organic extracting agent to remove tungsten therefrom and obtain an ammonium tungstate solution, evaporating said ammonium tungstate solution to form ammonium paratungstate crystals and a mother liquor, said mother liquor containing dissolved impurities including tungsten, silicon, arsenic, phosphorus and molybdenum, the improvement comprising: a process for recovering tungsten from a tungsten-containing material comprising the steps of digesting said tungsten-containing material in a sodium hydroxide solution to form a first sodium tungstate solution, evaporating said first sodium tungstate solution to obtain sodium tungstate crystals, and dissolving said sodium tungstate crystals in said mother liquor, said mother liquor being used for at least a portion of said aqueous medium, to form said second sodium tungstate solution, from which tungsten may be recovered.

* * * * *